(12) United States Patent
Kasuga et al.

(10) Patent No.: US 7,015,164 B2
(45) Date of Patent: Mar. 21, 2006

(54) OPTICAL GLASS, GLASS MATERIAL FOR PRESS MOLDING, OPTICAL ELEMENT, AND METHOD OF MANUFACTURING SAME

(75) Inventors: Yoshiko Kasuga, Koganei (JP); Kazuo Tachiwana, Hamura (JP); Hiroaki Yanagita, Hino (JP)

(73) Assignee: Hoya Corporation, Tokyo (JP)

( * ) Notice: Subject to any disclaimer, the term of this patent is extended or adjusted under 35 U.S.C. 154(b) by 426 days.

(21) Appl. No.: 10/270,303

(22) Filed: Oct. 15, 2002

(65) Prior Publication Data

US 2003/0096694 A1 May 22, 2003

(30) Foreign Application Priority Data

Oct. 15, 2001 (JP) ............................. 2001-316630
Nov. 14, 2001 (JP) ............................. 2001-349255

(51) Int. Cl.
*C03C 3/062* (2006.01)

(52) U.S. Cl. ................... 501/73; 65/61; 65/64; 65/104; 501/901

(58) Field of Classification Search .................... 65/61, 65/64, 104, 117; 501/73, 901
See application file for complete search history.

(56) References Cited

U.S. PATENT DOCUMENTS

| 4,213,786 A | 7/1980 | Faulstich et al. |
| 4,734,389 A | 3/1988 | Grabowski et al. |
| 6,332,338 B1 * | 12/2001 | Hashimoto et al. ........ 65/29.21 |
| 6,709,998 B1 * | 3/2004 | Wolff et al. ................... 501/73 |

FOREIGN PATENT DOCUMENTS

DE 196 03 050 3/1997

(Continued)

*Primary Examiner*—Sean Vincent
(74) *Attorney, Agent, or Firm*—Sughrue Mion, PLLC

(57) ABSTRACT

Disclosed is an optical glass comprising, expressed as weight percentages, greater than or equal to 18 percent and less than 30 percent of $SiO_2$, greater than or equal to 12 percent and less than 23 percent of BaO, 22 to 37 percent $TiO_2$, greater than or equal to 7 percent and less than 16 percent $Nb_2O_5$, 5 to 20 percent of $Na_2O$, 0 to 6 percent of $K_2O$, 0 to 5 percent of CaO, 0 to 5 percent of SrO, 0 to 4 percent of $ZrO_2$, 0 to 3 percent of $Ta_2O_5$, 0 to 1 percent of $Sb_2O_5$, and greater than or equal to 0 percent and less than 0.5 percent of $P_2O_5$, and by essentially not comprising PbO, $As_2O_3$, and F. The optical glass exhibits a refractive index (nd) greater than or equal to 1.80 and an Abbé number (vd) less than or equal to 30. A method of manufacturing a glass material for press molding is disclosed. This method comprises the steps of melting the glass starting materials, forming the glass melt obtained, and annealing the formed glass and is characterized in that: the glass melt has a composition such that, (1) when rapidly cooled to room temperature, said glass melt becomes glass that has a scattering coefficient of less than 0.005 $cm^{-1}$ at wavelengths of from 400 to 2,500 nm or comprises crystals with a volumetric ratio of less than $10^{-6}$, and (2) when maintained for three hours at a temperature 10° C. higher than the glass transition temperature, maintained for 10 min at a temperature yielding a viscosity of $10^{4.5}$ to $10^{3.5}$ dPa·s, and then rapidly cooled to room temperature, said glass melt becomes glass that has a scattering coefficient at at least one wavelength from 400 to 2,500 nm of greater than 0.01 $cm^{-1}$ or comprises crystals with a volumetric ratio of greater than $10^{-5}$; and an annealing of said formed glass is conducted at a temperature lower than the glass transition temperature.

13 Claims, 4 Drawing Sheets

FOREIGN PATENT DOCUMENTS

| | | |
|---|---|---|
| DE | 101 33 763 | 8/2002 |
| JP | 52-45612 | 4/1977 |
| JP | 62-87432 | 4/1987 |

* cited by examiner

OPTICAL GLASS, GLASS MATERIAL FOR PRESS MOLDING, OPTICAL ELEMENT, AND METHOD OF MANUFACTURING SAME

TECHNICAL FIELD

The present invention relates to an optical glass, a glass material for press molding, an optical element, and a method of manufacturing the same. The present invention relates to an optical glass having a high refractive index, good dispersion characteristics, and good resistance to devitrification; an optical element and a glass material for press molding employing this optical glass; and a method of manufacturing optical elements with high productivity employing this optical glass without causing the glass to devitrify.

Further, the present invention relates to a method in which a glass material for press molded articles is manufactured from a glass melt, and this material is used to manufacture press molded glass articles such as optical element blanks. The present invention also relates to a method of manufacturing optical elements such as lenses from articles press molded from glass.

BACKGROUND OF THE ART

Known glasses having optical characteristics such as a high refractive index ($nd \geq 1.8$) and good dispersion ($vd \leq 30$) include $SiO_2$—$Na_2O$—$K_2O$—$BaO$—$TiO_2$—$Nb_2O_5$ based glass (Japanese Unexamined Patent Publication (KOKAI) Heisei No. 4-36103) and similar glass comprising $B_2O_3$ (U.S. Pat. No. 4,734,389).

One known method of manufacturing optical elements such as lenses is to manufacture an intermediate product called an "optical element blank" that is similar in form to the optical element and then grind and polish the intermediate product to obtain an optical element. Such methods of manufacturing intermediate products include the method of press molding a suitable quantity of glass melt to obtain the intermediate product (known as the "direct pressing method"); the method of casting glass melt into a glass plate in a casting mold, cutting this glass plate into multiple pieces of glass, reheating the glass pieces to soften them, and press molding the glass pieces into intermediate products; and the method of forming blocks of glass known as "glass gobs" from suitable quantities of glass melt, barrel grinding the glass gobs, reheating the glass gobs to soften them, and conducting press molding to obtain intermediate products. The method of reheating the glass to soften it and conducting press molding is referred to as the "reheat press method" to distinguish it from the direct press method.

All of these methods have in common the forming of glass while in a molten state followed by cooling, solidification to obtain a formed product, and machining of the formed product by processes such as cutting, grinding, and polishing. However, residual distortion resulting from the cooling process is present in the formed glass product obtained by forming while soft, and this product tends to be damaged during machining. Thus, it must be annealed prior to machining to reduce residual distortion.

However, when these methods are applied to the manufacturing of optical elements of glass having a high refractive index and good dispersion, there are unavoidable problems in that the glass devitrifies during the manufacturing process and the yield drops. In particular, when employing the reheat press method, devitrification of the glass is marked. This devitrified glass is unsuited to use in optical elements such as lenses.

That is, the press molding of those optical glasses with essential components in the form of $SiO_2$, $BaO$, and $TiO_2$ that have a refractive index (nd) of greater than or equal to 1.80 without devitrification is extremely difficult.

The first object of the present invention is to provide an optical glass having good resistance to devitrification, a high refractive index, and good dispersion; an optical element and a glass material for use in press molding comprised of this optical glass; and a highly efficient method of manufacturing optical elements employing this optical glass without causing the glass to devitrify.

There is also a method of pouring glass melt into a casting mold to form glass plates, annealing the glass plates, cutting the glass plates into cubes to obtain cut pieces, and grinding the glass pieces in a barrel grinder to obtain a material for press molding. This material is softened by heating and molded in what is known as "reheat pressing" to obtain molded products such as lens blanks. The lens blanks can then be ground and polished to manufacture lenses.

Almost all optical glasses serving as materials for lenses and the like yield optical element blanks of good quality by reheat press molding. However, depending on the type of glass, there are cases where, even when transparent material for press molding is employed, the molded glass devitrifies and cannot be employed in optical elements even with grinding and polishing.

It is not known why conventional, transparent materials for press molding devitrify when molded, and no countermeasures have been developed.

Accordingly, the second object of the present invention is to provide a method of manufacturing glass materials permitting the manufacturing of transparent press molded articles of high quality even from glass tending to devitrify during heat press molding, and a method of manufacturing press molded articles.

The third object of the present invention is to provide a method of manufacturing glass materials in which a determination is made as to whether the glass material is one tending to devitrify during reheat press molding, and when determined to be a glass material tending to devitrify, converted to a glass material tending not to devitrify; and a method of manufacturing press molded articles.

SUMMARY OF THE INVENTION

The present inventors conducted extensive research into achieving the above-stated first object, discovering that, in order to impart a high refractive index and good dispersion properties to optical glass, it was necessary to include $SiO_2$, $BaO$, and $TiO_2$ as essential components. They also discovered that the crystal nucleus forming temperature of such optical glass is near the glass transition temperature (Tg) on the high-temperature side; that this temperature range is generally suitable for use as the annealing temperature; that, as a result, annealing conducted within this temperature range generally causes the formation of crystal nuclei, and nuclear growth occurs as the result of subsequent reheating during press molding, tending to result in devitrification of the press molded article; and that crystal particles precipitating in conventional high refractive index, good dispersion glass grow from nuclei in the phase containing $BaO$ and $TiO_2$. They also discovered that in the case when a press molded article is subjected to grinding and polishing, crystal particles generated in the portion to be removed by the grinding and polishing are not problematic but generation of crystal particles in deeper area than the portion to be removed, i.e. interior of the press molded article, should be avoided. The present inventors then conducted further research into the optical characteristics, thermal characteristics, and devitrification tendencies of the glass, resulting in the present invention.

Further, the present inventors studied the relations between the glass transition temperature (Tg), nucleus forming temperature, crystal growing temperature, and melt temperature of glass vitrifying readily during reheat press molding and common glass to achieve the above-stated second and third objects. From differences therein, the present inventors extracted the properties causing the above-described problems in glass, and devised the present invention on that basis.

The present invention achieving the above-stated first object is as follows:

(1) An optical glass comprising, expressed as weight percentages, greater than 18.92 percent and less than 30 percent of $SiO_2$, greater than or equal to 12 percent and less than 23 percent of BaO, 22 to 37 percent $TiO_2$, greater than or equal to 7 percent and less than 16 percent $Nb_2O_5$, 5 to 20 percent of $Na_2O$, 0 to 6 percent of $K_2O$, 0 to 5 percent of CaO, 0 to 5 percent of SrO, greater than 0 to equal to or less than 4 percent of $ZrO_2$, 0 to 3 percent of $Ta_2O_5$, 0 to 1 percent of $Sb_2O_5$, and greater than or equal to 0 percent and less than 0.5 percent of $P_2O_5$, and essentially not comprising PbO, $As_2O_3$, and F; and wherein the weight ratio $SiO_2/TiO_2$ of $SiO_2$ to $TiO_2$ exceeds 0.86, and the index of refraction (nd) is greater than or equal to 1.84 and the Abbé number (vd) is less than or equal to 25.

(2) An optical glass comprising essential components in the form of $SiO_2$, BaO, and TiO; and having a resistance to devitrification such that the number density of the crystal particles precipitating out after being maintained for five hours at a temperature 20° C. higher than the glass transition temperature and then for five minutes at 900° C. is less than or equal to $12/mm^3$; wherein said glass exhibits a refractive index (nd) greater than or equal to 1.84; and an Abbé number (vd) less than or equal to 25.

(3) The optical glass according to (2), wherein the glass comprising, as weight percentages, greater than or equal to 18 percent and less than 30 percent of $SiO_2$, greater than or equal to 12 percent and less than 23 percent of BaO, 22 to 37 percent $TiO_2$, greater than or equal to 7 percent and less than 16 percent $Nb_2O_5$, 5 to 20 percent of $Na_2O$, 0 to 6 percent of $K_2O$, 0 to 5 percent of CaO, 0 to 5 percent of SrO, greater than 0 to equal to or less than 4 percent of $ZrO_2$, 0 to 3 percent of $Ta_2O_5$, 0 to 1 percent of $Sb_2O_5$, greater than or equal to 0 percent and less than 0.5 percent of $P_2O_5$, and essentially not comprising PbO, $As_2O_3$, and F.

(4) The optical glass according to (3), wherein the weight ratio $SiO_2/TiO_2$ of $SiO_2$ to $TiO_2$ exceeds 0.86.

(5) An optical element comprised of the optical glass according to (1) or (2).

(6) A method of manufacturing glass material for press molding comprising the steps of:
forming a melt glass;
annealing the formed glass; and
machining the annealed glass to obtain a glass material for press molding comprised of the optical glass of (1) or (2).

(7) A method of manufacturing optical elements comprising the steps of press molding a blank of the optical element with similar shape to the objective optical element, and subjecting the blank to grinding and polishing to obtain the optical element, wherein said blank of optical element is prepared by a method comprising the steps of forming a melt glass; annealing the formed glass; reheating the formed glass and press molding the formed glass to obtain the blank of optical element, and wherein the optical element comprising, as weight percentages, greater than or equal to 12 percent and less than 23 percent BaO, 22 to 37 percent $TiO_2$, greater than or equal to 7 percent and less than 16 percent of $Nb_2O_5$, 5 to 20 percent $Na_2O$, and $SiO_2$ in a quantity of from 0.8 to 1.36 times the quantity of $TiO_2$, essentially not comprising PbO, $As_2O_3$, and F, and having a refractive index (nd) of greater than or equal to 1.80 and an Abbé number (vd) of less than or equal to 30.

(8) The optical glass according to (7), wherein the weight ratio $SiO_2/TiO_2$ of $SiO_2$ to $TiO_2$ exceeds 0.86.

(9) A method of manufacturing optical elements characterized by comprising the steps of:
annealing a formed product obtained by forming the optical glass of (1) or (2);
machining;
reheating; and
press molding in a softened state.

(10) The method of manufacturing optical elements of (9), wherein said annealing is conducted at a temperature equal to or greater than the transition temperature of said optical glass.

(11) A method of manufacturing optical elements characterized by comprising the steps of:
annealing a formed product obtained by forming a glass comprising, as weight percentages, greater than or equal to 18 percent and less than 30 percent of $SiO_2$, greater than or equal to 12 percent and less than 23 percent of BaO, 22 to 37 percent $TiO_2$, greater than or equal to 7 percent and less than 16 percent $Nb_2O_5$, 5 to 20 percent of $Na_2O$, 0 to 6 percent of $K_2O$, 0 to 5 percent of CaO, 0 to 5 percent of SrO, 0 to 4 percent of $ZrO_2$, 0 to 3 percent of $Ta_2O_5$, 0 to 1 percent of $Sb_2O_5$, greater than or equal to 0 percent and less than 0.5 percent of $P_2O_5$, and essentially not comprising PbO, $As_2O_3$, and F;
machining;
reheating; and
press molding in a softened state.

(12) The method of manufacturing optical elements of (11), wherein said annealing is conducted at a temperature equal to or greater than the transition temperature of said optical glass.

(13) A method of manufacturing optical elements comprising the steps of:
annealing a formed product obtained by forming a glass glass comprising essential components in the form of $SiO_2$, BaO, and $TiO_2$; in that the refractive index (nd) is greater than or equal to 1.80; in that the Abbé number (vd) is less than or equal to 30; and having a resistance to devitrification such that the number density of the crystal particles precipitating out after being maintained for five hours at a temperature 20° C. higher than the glass transition temperature and then for five minutes at 900° C. is less than or equal to $12/mm^3$;
machining;
reheating; and
press molding in a softened state.

(14) The method of manufacturing optical elements of (13), wherein said annealing is conducted at a temperature equal to or greater than the transition temperature of said optical glass.

The present invention achieving the above-stated second and third objects is as follows:

(15) A method of manufacturing a glass material for press molding (manufacturing method A of the present invention) comprising the steps of melting the glass starting materials, forming the glass melt obtained, and annealing the molded glass, characterized in that:

said glass melt has a composition such that, (1) when rapidly cooled to room temperature, said glass melt becomes glass that has a scattering coefficient of less than 0.005 cm$^{-1}$ at wavelengths of from 400 to 2,500 nm or comprises crystals with a volumetric ratio of less than 10$^{-6}$, and (2) when maintained for three hours at a temperature 10° C. higher than the glass transition temperature, maintained for 10 min at a temperature yielding a viscosity of 10$^{4.5}$ to 10$^{3.5}$ dPa·s, and then rapidly cooled to room temperature, said glass melt becomes glass that has a scattering coefficient at at least one wavelength from 400 to 2,500 nm of greater than 0.01 cm$^{-1}$ or comprises crystals with a volumetric ratio of greater than 10$^{-5}$; and an annealing of said formed glass is conducted at a temperature lower than the glass transition temperature.

(16) A method of manufacturing a glass material for press molding (manufacturing method B of the present invention) comprising the steps of melting the glass starting materials, forming the glass melt obtained, and annealing the formed glass, characterized in that:

prior to said manufacturing method, a determination is made as to whether said glass melt has the properties of (1) becoming glass that has a scattering coefficient of less than 0.005 cm$^{-1}$ at wavelengths of from 400 to 2,500 nm or comprises crystals with a volumetric ratio of less than 10$^{-6}$, when rapidly cooled to room temperature, and (2) becoming glass that has a scattering coefficient at at least one wavelength from 400 to 2,500 nm of greater than 0.01 cm$^{-1}$ or comprises crystals with a volumetric ratio of greater than 10$^{-5}$, when maintained for three hours at a temperature 10° C. higher than the glass transition temperature, maintained for 10 min at a temperature yielding a viscosity of 10$^{4.5}$ to 10$^{3.5}$ dPa·s, and then rapidly cooled to room temperature; and when said glass melt has the properties of the glass of (1) and (2) above, annealing of said formed glass is conducted at a temperature lower than the glass transition temperature.

(17) The method of manufacturing a glass material for press molding according to (15) or (16) above further characterized in that said glass material comprises SiO$_2$, TiO$_2$, and Nb$_2$O$_5$.

(18) The method of manufacturing a glass material for press molding according to (15) or (16) above further characterized in that said glass material comprises SiO$_2$, TiO$_2$, and Nb$_2$O$_5$, and in that the combined content of TiO$_2$, and Nb$_2$O$_5$ of said glass material is greater than or equal to 35 weight percent.

(19) A method of manufacturing glass press molded articles characterized in that a glass material for press molding according to (15) or (16) above is heated, softened, and press molded.

(20) A method of manufacturing optical elements in which an optical element blank is molded by the method according to (19) above and said blank is ground and polished to obtain an optical element.

(21) A glass material for heating, softening, and press molding, characterized:

by being comprised of glass that has a scattering coefficient of greater than or equal to 0.01 cm$^{-1}$ at at least one wavelength of from 400 to 2,500 nm or comprises crystals with a volumetric ratio of greater than 10$^{-5}$, when maintained for three hours at a temperature ten degrees higher than the glass transition temperature, maintained for ten minutes at a temperature at which it exhibits a viscosity of 10$^{4.5}$ to 10$^{3.5}$ dPa·s, and rapidly cooled to room temperature, and, by having a scattering coefficient of glass interior at at least one wavelength from 400 to 2,500 nm of less than 0.005 cm$^{-1}$ or comprises in interior crystals with a volumetric ratio of less than 10$^{-6}$, when maintained for 10 min at a temperature yielding a viscosity of 10$^{4.5}$ to 10$^{3.5}$ dPa·s and then rapidly cooled to room temperature.

DISCLOSURE OF THE INVENTION

Figure 1:
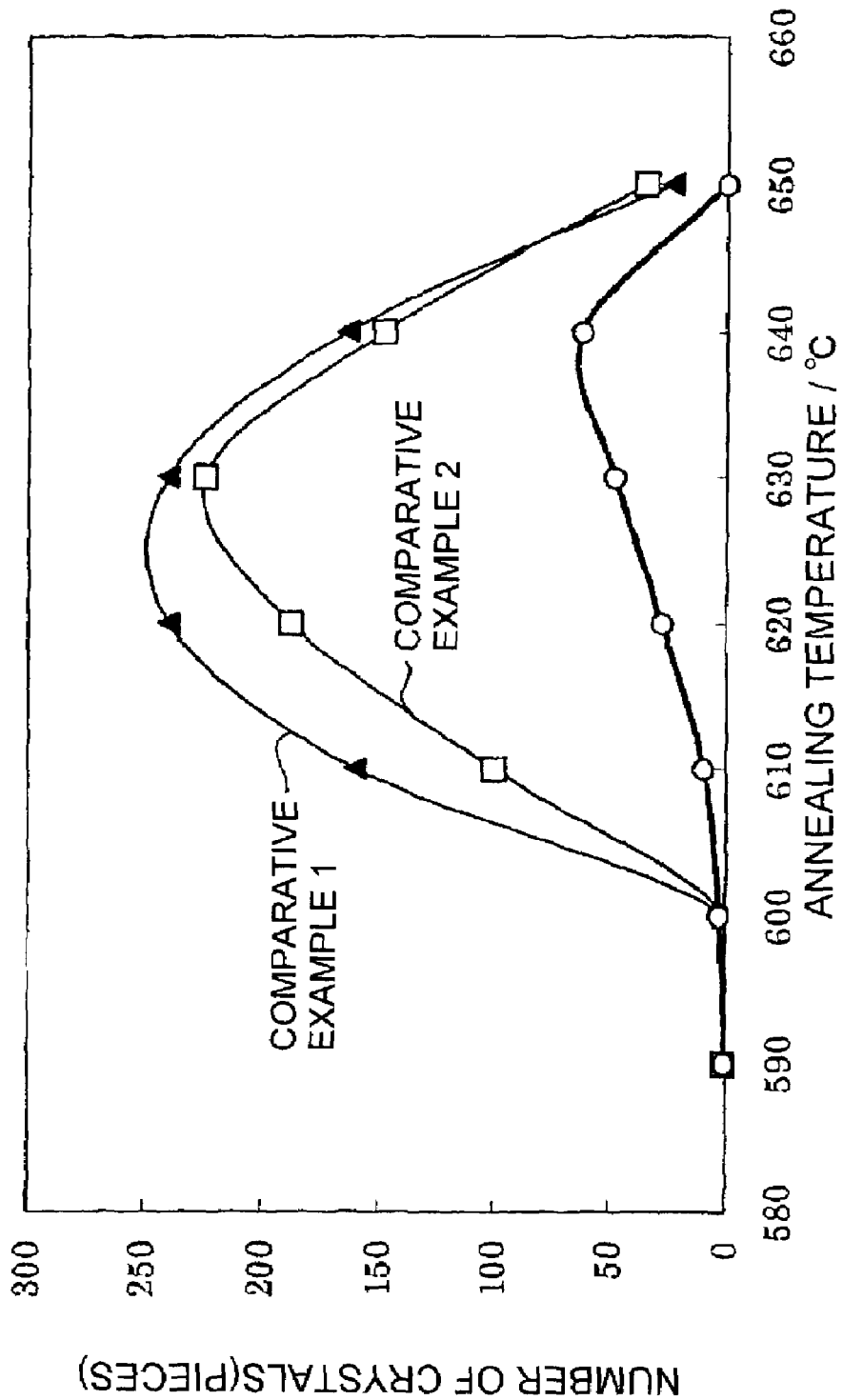
FIG. 1 is a graph showing changes in the number of crystals due to annealing conditions in the optical glasses of Example 1, Comparative Example 1, and Comparative Example 2.

The optical glass of the present invention has two modes: optical glass I and optical glass II. Optical glass I will be described first.

Optical glass I of the present invention is an optical glass having a glass composition, given as weight percentages, greater than or equal to 18 percent and less than 30 percent of SiO$_2$, greater than or equal to 12 percent and less than 23 percent of BaO, 22 to 37 percent TiO$_2$, greater than or equal to 7 percent and less than 16 percent Nb$_2$O$_5$, 5 to 20 percent of Na$_2$O, 0 to 6 percent of K$_2$O, 0 to 5 percent of CaO, 0 to 5 percent of SrO, 0 to 4 percent of ZrO$_2$, 0 to 3 percent of Ta$_2$O$_5$, 0 to 1 percent of Sb$_2$O$_5$, and greater than or equal to 0 percent and less than 0.5 percent of P$_2$O$_5$, and by essentially not comprising PbO, As$_2$O$_3$, and F. In the description set forth hereinbelow, contents are expressed as weight percentages.

In optical glass I, SiO$_2$, as a network-forming oxide, is the component effectively maintaining the melting property and fluid viscosity of the glass. It maintains a stable glass structure and effectively increases resistance to devitrification. Thus, it must be present in a quantity of greater than or equal to 18 percent. However, at greater than or equal to 30 percent, the refractive index decreases, precluding obtaining of the high refractive index glass that is the object of the present invention. Accordingly, SiO$_2$ is limited to greater than or equal to 18 percent and less than 30 percent, preferably greater than or equal to 24 percent and less than 30 percent.

BaO is an effective component for increasing the durability and thermal stability of the glass and must be incorporated at greater than or equal to 12 percent. However, when added in a quantity greater than or equal to 23 percent, the Abbé number increases, precluding the obtaining of a glass with good dispersion. Accordingly, the content thereof is limited to less than 23 percent, preferably from 14 to 20 percent.

$TiO_2$ is an essential component for achieving a high refractive index, high-dispersion glass and must be present in a quantity of greater than or equal to 22 percent. However, $TiO_2$ is a principal component of crystals forming in optical glass I during reheating and softening, and is a nucleus forming oxide. Thus, when added in a proportion of greater than 37 percent in an attempt to increase the refractive index, not only does the resistance to devitrification drop sharply, but there is also a shift to the long wavelength side of the transmission absorption edge. Accordingly, $TiO_2$ is limited to 22 to 37 percent, preferably 25 to 32.5 percent.

$Nb_2O_5$ is a required component for high refractive index, high-dispersion glass, and since it also contributes to the stability of the glass, is required in a proportion of greater than or equal to 7 percent. However, since resistance to devitrification deteriorates at greater than or equal to 16 percent, the above-stated range is established. This range is preferably greater than or equal to 10 percent and less than 16 percent.

Network-modifying oxides such as $Na_2O$ and $K_2O$ are effective components for reducing the glass transition temperature (Tg). Thus, the proportion of $Na_2O$ is set at greater than or equal to 5 percent. However, since resistance to devitrification and the refractive index both drop sharply over 20 percent, the proportion of $Na_2O$ is set to less than or equal to 20 percent, with from 9.5 to 13.5 percent being preferred. It is necessary to add less than or equal to 6 percent $K_2O$, preferably less than or equal to 5 percent.

CaO and SrO have effects similar to that of BaO and may be added in quantities up to 5 percent. However, at greater than 5 percent, resistance to devitrification decreases. Accordingly, the content of CaO and SrO is limited to from 0 to 5 percent.

$ZrO_2$ and $Ta_2O_5$ are components that impart a high refractive index, improving resistance to devitrification when added in small amounts. However, when the quantity of $ZrO_2$ exceeds 4 percent, or that of $Ta_2O_5$ exceeds 3 percent, resistance to devitrification drops. Accordingly, the quantity of $ZrO_2$ is set to 0 to 4 percent and that of $Ta_2O_5$ to 0 to 3 percent. Preferably, $ZrO_2$ is comprised as the essential component.

In addition to the above components, a clarifying agent in the form of $Sb_2O_5$ may be added in a proportion of less than or equal to 1 percent, preferably less than or equal to 0.1 percent. The amount of $Sb_2O_5$ added is expressed here by the amount obtained by conversion of the amount of antimony oxide present in glass into the amount of $Sb_2O_5$. The amount of antimony oxide can be converted into the amount of $Sb_2O_3$. The antimony oxide amount converted into $Sb_2O_3$ is very similar to the $Sb_2O_5$ amount and the $Sb_2O_3$ amount is also less than or equal to 1 percent, preferably less than or equal to 0.1 percent.

Further, since $P_2O_5$ has a strong crystal nucleus forming action, it must be admixed in a proportion of less than 0.5 percent, but is preferably essentially absent.

Optical glass I essentially does not comprise PbO or $As_2O_3$ due to stringent environmental protection requirements. F must be essentially excluded because it reduces homogeneity due to volatization during melting.

In a preferred composition, optical glass I comprises, as weight percentages, greater than or equal to 24 percent and less than 30 percent of $SiO_2$, greater than or equal to 12 percent and less than 23 percent of BaO, 22 to 37 percent $TiO_2$, greater than or equal to 10 percent and less than 16 percent $Nb_2O_5$, 5 to 20 percent of $Na_2O$, 0 to 6 percent of $K_2O$, 0 to 5 percent of CaO, 0 to 5 percent of SrO, 0 to 4 percent of $ZrO_2$, 0 to 3 percent of $Ta_2O_5$, 0 to 1 percent of $Sb_2O_5$, and greater than or equal to 0 percent and less than 0.5 percent of $P_2O_5$, and essentially does not comprise PbO, $As_2O_3$, and F. In a more preferred composition, optical glass I comprises, as weight percentages, greater than or equal to 24 percent and less than 30 percent of $SiO_2$, 14 to 20 percent of BaO, 25 to 32.5 percent $TiO_2$, greater than or equal to 10 percent and less than 16 percent $Nb_2O_5$, 9.5 to 13.5 percent of $Na_2O$, 0 to 5 percent of $K_2O$, 0 to 5 percent of CaO, 0 to 5 percent of SrO, 0 to 4 percent of $ZrO_2$, 0 to 3 percent of $Ta_2O_5$, and 0 to 0.1 percent of $Sb_2O_5$.

In optical glass I, the, total content of $SiO_2$, BaO, $TiO_2$, $Nb_2O_5$, $Na_2O$, $K_2O$, CaO, SrO, $ZrO_2$, $Ta_2O_5$, and $Sb_2O_5$ is desirably greater than or equal to 95 percent, preferably greater than or equal to 99 percent, and more preferably 100 percent.

Further, the total content of $SiO_2$, BaO, $TiO_2$, $Nb_2O_5$, $Na_2O$, $ZrO_2$, and $Sb_2O_5$ is desirably greater than or equal to 95 percent, preferably greater than or equal to 99 percent, and more preferably 100 percent.

Based on the above-stated composition, it is possible to achieve optical glass with a refractive index (nd) of greater than or equal to 1.80, an Abbé number (vd) of less than or equal to 30, and good resistance to devitrification.

Resistance to devitrification tends to drop sharply when the refractive index (nd) is greater than or equal to 1.84 and the Abbé number (vd) is less than or equal to 25. However, it is possible to conduct good molding without any problem with devitrification even in this range with optical glass I. Accordingly, the range where the refractive index (nd) is greater than or equal to 1.84 and the Abbé number (vd) is less than or equal to 25 is desirable, and the range where the refractive index (nd) is greater than or equal to 1.85 and the Abbé number (vd) is less than or equal to 25 is more desirable.

Based on optical glass I, it is possible to prevent devitrification in molded articles even when the glass melt is press molded while the glass is still in a soft state to produce molded glass articles. When producing optical elements by forming glass melt into a formed glass material; annealing the material; and heating, softening, and molding the material, it is necessary to pay special attention to the resistance to devitrification of the glass. With optical glass I, the tendency to crystallize during softening depends on the quantities of $SiO_2$ and $TiO_2$. Thus, when reheating, softening, and molding, the quantity of $SiO_2$ relative to the quantity of $TiO_2$ denoted as a weight percent (the weight ratio of $SiO_2/TiO_2$) is desirably greater than or equal to 0.8, preferably greater than or equal to 0.84, and more preferably exceeds 0.86.

Optical glass I essentially does not contain the components PbO, $As_2O_3$, and F; $P_2O_5$ is also essentially absent. In addition to these components, other substances the quantities of which must be limited to improve resistance to devitrification, such as $Al_2O_3$, $La_2O_3$, $Y_2O_3$, $Gd_2O_3$, $CeO_2$, other rare earth metal oxides, and platinum, will now be described.

For the reasons stated above, the content of $Al_2O_3$ is desirably less than or equal to 0.2 percent, with the absence thereof being preferred.

For the reasons stated above, the total quantity of $La_2O_3$, $Y_2O_3$, $Gd_2O_3$, and $CeO_2$ is desirably less than or equal to 1 percent, with the absence thereof being preferred. Thus, the total quantity of rare earth metal oxides is desirably less than or equal to 1 percent, with the absence thereof being preferred.

For the reasons stated above, it is necessary to pay careful attention to preventing the admixing of platinum, with a quantity of less than or equal to 10 ppm being desirable and the complete prevention of admixing being particularly preferred.

Optical glass II will now be described.

Optical glass II of the present invention comprises essential components in the form of $SiO_2$, BaO, and $TiO_2$; has a refractive index (nd) of greater than or equal to 1.80 and an Abbé number (vd) of less than or equal to 30; and has a resistance to devitrification in the form of a number density of crystal grains precipitating that is less than or equal to 12/mm$^3$ after five hours at a temperature 20° C. greater than the glass transition temperature and 5 minutes at 900° C. The number density of crystal grains means here that a number density of crystal grains present at the center of the glass to be estimated.

Optical glass II has particularly good resistance to devitrification, and is particularly good when the annealed glass is heated and softened for molding.

By imparting this resistance to devitrification, devitrification of the glass can be prevented even when the glass is reheated to a temperature permitting molding under heating conditions following annealing. In particular, even when the annealing temperature is made greater than or equal to the glass transition temperature to efficiently eliminate distortion, crystal nucleation does not progress during annealing, nor does crystal nucleation progress or devitrification occur during subsequent reheating and softening steps.

The above-mentioned number density of crystal grains can be obtained, for example, by heating pieces of optical glass II, cooling them, and forming samples including the center of the pieces and measuring 3×3×1 mm, and then observing them under an optical microscope at 50-fold magnification, and converting the number of crystal grains contained in the samples to the number of crystal grains per unit volume. When the number of crystal grains in the samples is less than or equal to 100, the number density is less than or equal to 12/mm$^3$.

Optical glass II preferably has a resistance to devitrification in the form of a number density of crystal grains precipitating out after being maintained for five hours at any temperature within 590–650° C. and then being maintained at 900° C. for 5 min of less than or equal to 12/mm$^3$. Here, the term "any temperature within 590–650° C." is used to mean that it suffices for a sample that has been maintained for five hours at each of 7 temperature conditions of from 590° to 650° C. in increments of 10° C., and then maintained at 900° C. for 5 min, to have a number density of crystal grains precipitating out within the above stated range; there is no requirement of setting countless conditions within the range of 590–650° C. to test the resistance to devitrification. The method of measuring the number density of crystal grains is identical to that set forth above.

The total combined content of $SiO_2$, BaO, $TiO_2$, $Nb_2O_5$, $Na_2O$, $K_2O$, CaO, SrO, $ZrO_2$, $Ta_2O_5$, and $Sb_2O_5$ in optical glass II is desirably greater than or equal to 95 percent, preferably greater than or equal to 99 percent, and more preferably 100 percent.

Further, it is more desirable for the total combined content of $SiO_2$, BaO, $TiO_2$, $Nb_2O_5$, $Na_2O$, $ZrO_2$ and $Sb_2O_5$ to be greater than or equal to 95 percent, more preferably greater than or equal to 99 percent, and most preferably, 100 percent.

Further, in optical glass II, as well, the tendency to crystallize during reheating and softening depends on the quantities of $SiO_2$ and $TiO_2$. To improve resistance to devitrification, the quantity of $SiO_2$ relative to the quantity of $TiO_2$ when the two are denoted as weight percentages (the weight ratio of $SiO_2/TiO_2$) is desirably greater than or equal to 0.8, preferably greater than or equal to 0.84, and most preferably exceeding 0.86.

In optical glass II, as well, PbO, $As_2O_3$, and F are desirably essentially absent, with $P_2O_5$ also being desirably essentially absent.

As in optical glass I, $Al_2O_3$ is also desirably kept to less than or equal to 0.2 percent and preferably not added at all.

As in optical glass I, the total combined quantity of $La_2O_3$, $Y_2O_3$, $Gd_2O_3$, and $CeO_2$ is desirably less than or equal to 1 percent, and is preferably 0 percent. Thus, the total quantity of rare earth metal oxides is desirably less than or equal to 1 percent, with the absence thereof being preferred.

As in optical glass I, careful attention must be paid to not admixing platinum, with a content of less than or equal to 10 ppm being desirable and the complete prevention of admixture being particularly preferred.

The composition of optical glass I and the desirable compounds in the composition of optical glass I are preferred in the composition of optical glass II. For the above-stated reasons, a refractive index (nd) of greater than or equal to 1.84 and an Abbé number (vd) of less than or equal to 25 are desirable.

The glass material for press molding and its manufacturing method will be described next.

The glass material for press molding of the present invention consists of above-described optical glass I or II. It is heated and then press molded while soft to obtain various glass molded articles such as optical element blanks. Given as weight percentages, it comprises greater than or equal to 12 percent and less than 23 percent BaO, 22 to 37 percent $TiO_2$, greater than or equal to 7 percent and less than 16 percent of $Nb_2O_5$, 5 to 20 percent $Na_2O$, and $SiO_2$ in a quantity of from 0.8 to 1.36 times the quantity of $TiO_2$, essentially not comprising PbO, $As_2O_3$, and F. It has a refractive index (nd) of greater than or equal to 1.80 and an Abbé number (vd) of less than or equal to 30. Similarly, it is heated and press molded while soft into molded glass articles such as optical element blanks.

Examples of glass materials for press molding are bodies of revolution such as spheres and marbles, polyhedrons, and tabular bodies. Examples of surface states are free surfaces and surfaces that have been roughened to obtain frosted glass.

The method of manufacturing glass materials for press molding will be described next. The glass material may be either above-described optical glass I or II comprising, when denoted as weight percentages, greater than or equal to 12 percent and less than 23 percent of BaO, 22 to 37 percent $TiO_2$, greater than 7 percent and less than 16 percent $Nb_2O_3$, 5 to 20 percent $Na_2O$, a quantity of $SiO_2$ of from 0.8 to 1.36-fold the quantity of $TiO_2$, essentially not comprising PbO, $As_2O_3$, and F, having a refractive index (nd) of greater than or equal to 1.80, and having an Abbé number (vd) of less than or equal to 30.

Methods of manufacturing are: (1) casting the glass melt in a casting mold to form glass plates of the glass material (method 1), (2) annealing the glass plates and cutting them to desired size to produce multiple glass blocks called "cut pieces" (method 2), (3) barrel grinding the multiple glass pieces produced by the previous method (method 3), (4) forming glass gobs by causing the glass melt to flow downward out of a pipe (method 4), and (5) annealing the glass gobs obtained by the previous method followed by barrel grinding (method 5).

The glass material for press molding referred to here may be those employed without alteration in press molding (material 1) or cut, ground, polished, or otherwise machined for press molding (material 2). Cutting may be accomplished by forming a groove on a portion of the surface of the glass sheet to be cut by a method known as "scribing" and applying localized pressure on the groove portion from the rear of the surface on which the groove has been formed to divide the glass plate at the groove portion; or by using a cutting blade to cut the glass plate. The above-mentioned barrel grinding is the grinding and polishing method of preference.

Glass materials manufactured by above-described methods 3, 4, and 5 are examples of material 1, and glass materials manufactured by above-described methods 1, 2, and 4 are examples of material 2.

The glass material for press molding of the present invention may be preferred when machined and then reheated for press molding, or when previously machined and then reheated and press molded. Since distortion is readily removed from these glass materials for press molding by annealing, the risk of damaging the glass during machining is reduced.

Since the glass material for press molding comprised of the above-described glass material is either machined by cutting, grinding, or polishing after forming of glass melt under heating conditions (the method of molding while the melted glass is soft), or is a material that has already been machined, preventing damage by machining requires annealing to remove distortion prior to machining. Annealing is normally conducted at the glass transition temperature or higher. In the case of a glass material for press molding in the form of optical glass I or II, which have good resistance to devitrification, devitrification of the glass due to reheating during press molding is prevented even when annealing is conducted at such temperatures. Thus, it is possible to press mold optical elements or optical element blanks with a refractive index (nd) of greater than or equal to 1.80 and an Abbé number (vd) of less than or equal to 30 without causing the glass to devitrify.

Further, since the temperature used in annealing prior to press molding may be set to suitably eliminate distortion without concern for devitrification due to reheating, the time required for annealing is shortened and optical elements and press molded articles such as optical element blanks may be manufactured with good efficiency.

Optical elements and their method of manufacture will be described next.

The optical element of the present invention covers optical elements comprised of above-described optical glass I or II on the surface of which are formed multilayered optical films such as antireflective films, highly reflective films, and optical multilayer films having optical wavelength specificity. Preferred examples of such optical elements are optical lenses exploiting high reflective index and high dispersion characteristics. Further examples are prisms, filters, optical substrates, diffraction gratings, and other known optical elements.

According to the method of the present invention, the optical element can be efficiently manufactured by obtaining a formed product by forming above-described optical glass I or II, annealing this product at a temperature greater than or equal to the transition temperature of the optical glass, machining it, and then reheating it and molding it while in a soft state. Hot forming (forming while the glass melt is soft) is particularly suitable for the above-mentioned forming, and press molding is suitable for molding.

Molding is sometimes used to manufacture an optical element blank similar in shape to the desired optical element, which is then ground and polished to manufacture the optical element, and sometimes used to directly manufacture the optical element. For example, molding is suited to methods of manufacturing comparatively large optical elements and spherical lenses in which glass is press molded to obtain a blank and the blank is then ground and polished to obtain a final product. It is also suited to methods of manufacturing comparatively small lenses, including aspherical lenses and microlenses by methods (referring to precision press molding or mold optics molding) in which a final product in the form of an optical element is manufactured by molding.

When manufacturing an optical element blank by press molding, the glass material for press molding is heated and softened, and pressure is applied with a pressure mold. The viscosity of the glass during pressing is desirably $10^3$ to $10^5$ Pa,s. The heating and molding steps may be conducted in air. When preparing an optical element by grinding and polishing an optical element blank, crystal grains contained in the portion removed by the grinding and polishing are not problematic. However, number density of crystal grains contained in the interior of the blank should be set within the certain range mentioned-above because which will occur light scattering.

When manufacturing an optical element by precision pressure molding, the glass material for press molding is heated and softened, and pressure is applied with a pressure mold. The viscosity of the glass during pressing, at $10^4$ to $10^7$ Pa,s, is higher than during press molding of blanks, and it is desirable to employ a non-oxidizing gas such as nitrogen as the press molding atmosphere.

According to the present invention, since optical glass I or II is employed as the material of the optical element, devitrification of the glass during remolding can be decreased even when annealing, prior to molding, is conducted at a temperature greater than or equal to the glass transition temperature, annealing efficiency can be increased while preventing devitrification, and the efficiency of optical element production can be increased.

Manufacturing methods A and B of the present invention were devised based on the following knowledge.

Figure 2:
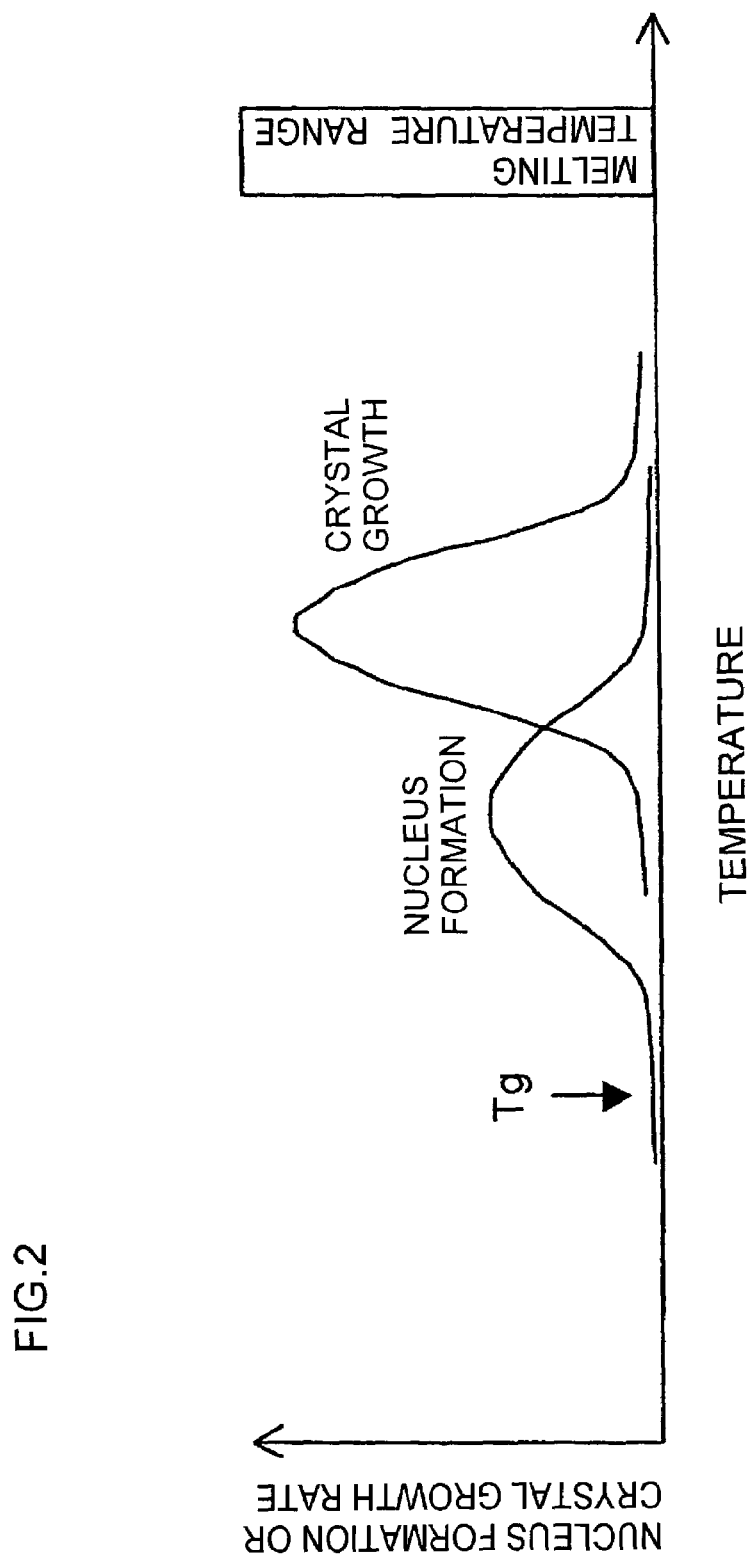
FIG. 2 shows the relation between the glass transition temperature (Tg), nucleus forming temperature, crystal growth temperature, and melting temperature of common glass.

In common glass, the relation between the glass transition temperature (Tg), nucleus formation temperature, crystal growth temperature, and melting temperature is as shown in FIG. 2. By contrast, in glass in which the above-described problems occur, the relation is thought to be as shown in FIG. 3.

In conventional methods of manufacturing glass materials, the formed glass obtained from the glass melt is annealed in a temperature range slightly higher than the Tg. In that case, glass having the relation between the glass transition temperature (Tg) and the nucleus forming temperature shown in FIG. 2 undergoes almost no nucleus formation during annealing. However, in glass having the relation between the glass transition temperature (Tg) and the nucleus forming temperature shown in FIG. 3, the annealing temperature extends into the nucleus forming temperature range when annealing is conducted at a temperature range slightly higher than the Tg. Thus, nucleus formation occurs during annealing. However, since the nuclei are minute, the glass itself remains transparent. The annealed glass is then either cold processed or employed as is as a glass material for press molding.

Subsequently, the glass is heated to the crystal growth temperature range for reheat pressing. In glass having the relation between the glass transition temperature (Tg) and nucleus forming temperature shown in FIG. 2 in which nuclei do not form, crystal growth is not caused by heating during reheat pressing and a press molded article with transparent interior is obtained.

Figure 3:
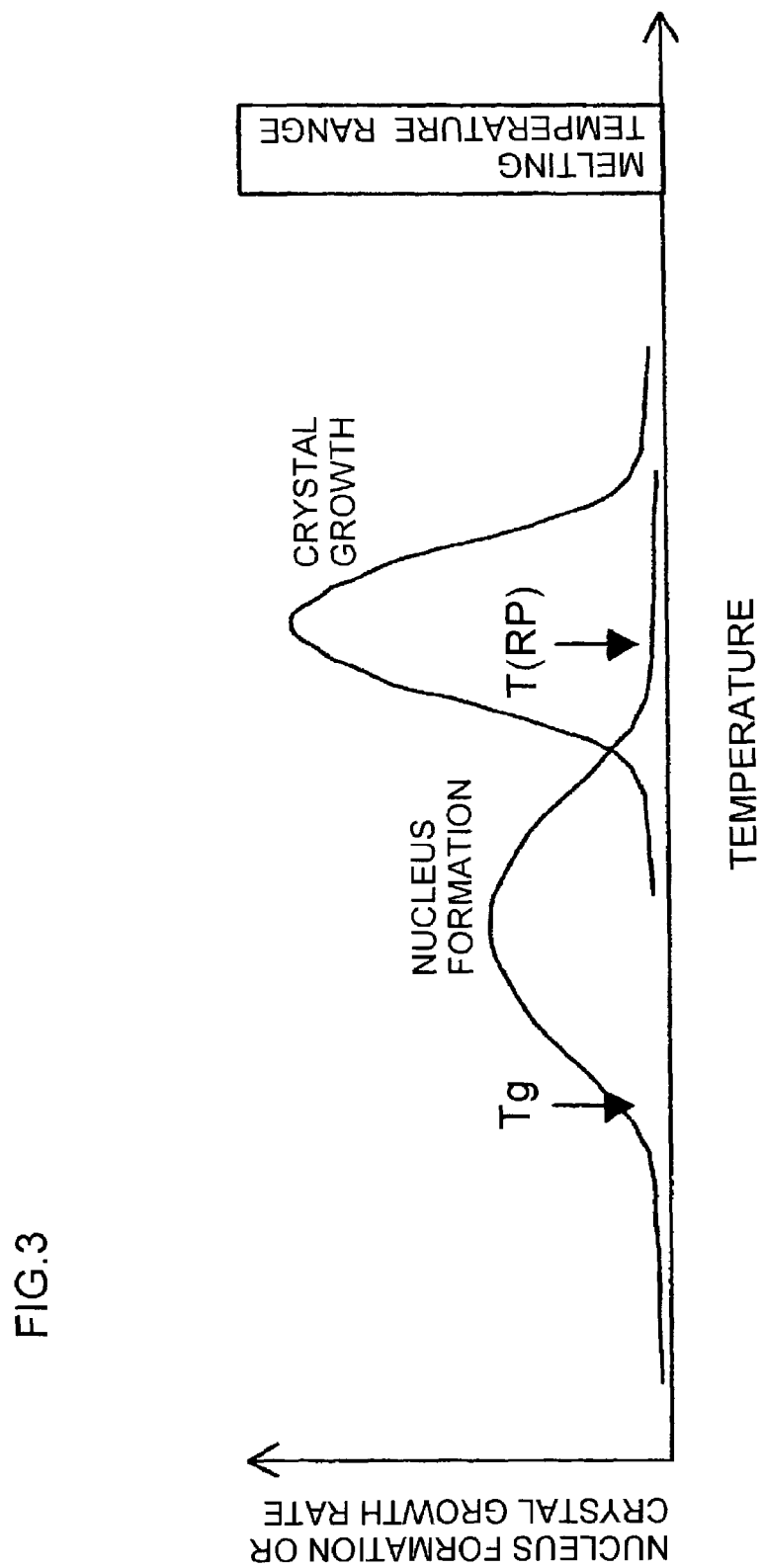
FIG. 3 shows the relation between the glass transition temperature (Tg), nucleus forming temperature, crystal growth temperature, and melting temperature of glass through to be problematic.

However, in glass having the relation between the glass transition temperature (Tg) and nucleus forming temperature shown in FIG. 3, nuclear formation occurs during annealing as set forth above, glass crystallization progresses due to reheating during reheat pressing, and devitrification occurs.

Accordingly, in manufacturing method A of the present invention, the above-stated problem was solved by keeping the annealing temperature to below the glass transition temperature (Tg) for glass having the properties shown in FIG. 3 that was to be used as a glass material. Further, in manufacturing method B of the present invention, the above-stated problem was solved by determining in advance whether glass to be used as glass material was glass having the properties shown in FIG. 3 and then keeping the annealing temperature to below the glass transition temperature (Tg) for glass having the properties shown in FIG. 3.

The viscosity of glass is known to be about $2 \times 10^{13}$ dPa·s at the glass transition temperature (*Glass Optics Handbook* (Asakura Shoten, 1999) p. 356). During annealing to eliminate distortion, the glass has a viscosity greater than the viscosity at which it is distorted by its own weight, and annealing is normally conducted at a temperature at which elimination of distortion is rapidly completed. At or below the temperature at which the viscosity reaches $4 \times 10^{14}$ dPa·s (the strain temperature), the glass does not undergo viscous flow and distortion cannot be eliminated no matter how long the glass is maintained at this temperature. One measure of the distortion eliminating annealing temperature is a temperature known as the slow cooling point. The viscosity of the glass at this temperature is $1 \times 10^{13}$ dPa·s. When maintained at this temperature for 15 min, internal distortion is considered to be eliminated. Although this temperature depends on the glass composition, it is higher than the Tg; for example, about Tg plus 10 to 50° C. On this basis, annealing to remove distortion has usually been conducted at a temperature greater than the Tg using the slow cooling point as yardstick.

By contrast, in the method of the present invention, since the glass has the peculiar properties set forth above, the annealing temperature is set below the glass transition temperature. The temperature below the glass transition temperature at which to set the annealing temperature can be suitably determined by considering the relation between the glass transition temperature (Tg) and the nucleus forming temperature of the individual glass. For example, the annealing temperature is desirably set to 10° C. below Tg, more preferably 15° C. below Tg. Simply lowering the annealing temperature prevents the formation of crystal nuclei due to annealing. However, when set too low, distortion remains. Thus, the maximum temperature during annealing is desirably set to within a range of from 35° to 15° C. below Tg.

In the manufacturing methods of the present invention, the glass employed as glass material has a composition such that, (1) when rapidly cooled to room temperature, the glass melt becomes glass that has a scattering coefficient of less than 0.005 cm$^{-1}$ at wavelengths of from 400 to 2,500 nm or comprises crystals with a volumetric ratio of less than 10$^{-6}$, and (2) when maintained for three hours at a temperature 10° C. higher than the glass transition temperature, maintained for 10 min at a temperature yielding a viscosity of 10$^{4.5}$ to 10$^{3.5}$ dPa·s, and then rapidly cooled to room temperature, the glass melt becomes glass that has a scattering coefficient at at least one wavelength from 400 to 2,500 nm of greater than 0.01 cm$^{-1}$ or forms crystals with a volumetric ratio of greater than 10$^{-5}$.

Glass exhibit property (1) essentially does not contain crystals. This property is essential in optical glass materials for practical use. Glass with a scattering coefficient of greater than or equal to 0.005 cm$^{-1}$ at wavelengths of 400 to 2,500 nm when rapidly cooled at room temperature, or having a volumetric ratio of 10$^{-6}$ or more crystals, cannot be employed as optical glass. The term "rapid cooling" refers to cooling from a melt state to the glass transition temperature minus 100° C. at a rate of 10 degrees/minute or greater.

Glass exhibiting property (2) can be employed as optical glass depending on the conditions and has the relation shown in FIG. 3.

The method of determining whether glass to be employed as a glass material has the relation shown in FIG. 3 conducted by:

maintaining glass essentially containing no crystals for 3 hours at a temperature 10° C. higher than the glass transition temperature;

maintaining the glass for a period selected from within the range of from 1 to 30 minutes at a temperature at which the viscosity of the glass reaches 10$^{4.5}$ to 10$^{3.5}$ dPa·s (poises) and then cooling the glass rapidly; and, observing whether the glass reaches a scattering coefficient of greater than or equal to 0.01 cm$^{-1}$ at at least one wavelength within the wavelength range (400 to 2,500 nm) at which optical glass is employed, or contains more than 10$^{-5}$ crystals as a volumetric ratio. The period of maintenance of a temperature at which the viscosity of the glass reaches 10$^{4.5}$ to 10$^{3.5}$ dPa·s can be selected to be adequate for determining the resistance to crystallization property of the glass in consideration of the heat load during the subsequent reheating and press molding, with a period of about 10 minutes normally being adequate. The term "rapid cooling" refers to cooling from a melt state to the glass transition temperature minus 100° C. at a rate of 10 degrees/minute or greater.

When the glass is determined to have a scattering coefficient of greater than or equal to 0.01 cm$^{-1}$ or contain more than 10$^{-5}$ crystals as a volumetric ratio, it has the relation shown in FIG. 3 and annealing to remove distortion is conducted under the above-stated conditions. Conventionally, when such a glass is annealed prior to press molding and exposed to a temperature higher than the glass transition temperature, crystal nuclei form and the heating during press molding causes the press molded product to devitrify.

The scattering loss coefficient is determined by the following method. The internal transmittance $I_1$ at which surface reflection of the glass (of thickness d (cm)) is eliminated prior to heat treatment is calculated in advance. Next, the internal transmittance $I_s$ without the surface reflection of the glass (of thickness d (cm)) following heat treatment is calculated. The scattering loss coefficient (unit: cm$^{-1}$) is then calculated per unit thickness from the following:

$$1/d \cdot ln(I_1/I_s)$$

A commercial dual-beam ultraviolet and visible light spectrophotometer may be employed as the measurement device.

The above method yields the scattering loss coefficient per unit thickness from change in internal transmittance due to scattering. However, any means of satisfying this element may be employed, and there is no restriction to the stated method.

An example of a glass having the relation indicated in FIG. 3 is three-component glass comprising $SiO_2$, $TiO_2$, and $Nb_2O_5$. In glasses comprising excess quantities of these components, the components are thought to function as nucleus forming materials in certain composition ranges. Specifically, in glasses comprising 35 weight percent or more of $TiO_2$ and $Nb_2O_5$ in combined quantity, this phenomenon is marked. Although also depending on the quantities of other components, the upper limit to the combined quantity of these components is thought to be 50 weight percent. Thus, the method of the present invention is suited to manufacturing glass materials for press molding from glasses comprising the three components $SiO_2$, $TiO_2$, and $Nb_2O_5$, particularly glasses comprising 35 weight percent or more and 50 weight percent or less of $TiO_2$ and $Nb_2O_5$ combined.

Even glass having the relation indicated in FIG. 3, obtained by the manufacturing method of the present invention can be reheat press molded to obtain transparent molded products that are suitable as optical elements or blanks for the manufacturing of optical elements.

In the manufacturing method of the present invention, known conditions and methods may be employed without alteration in the steps of melting the glass starting materials, forming the glass melt obtained, and annealing the formed glass. For example, examples of methods of manufacturing glass materials for press molding that are suitable for use are the method of causing glass melt to flow through a nozzle into a receiving mold depression to form a glass gob; the method of further rough grinding the glass gob; and the method of casting glass melt in a casting mold to obtain plates, cutting to required shape, and rounding the corners and edges.

The present invention also covers glass material for heating, softening, and press molding, which is prepared by the above-mentioned process. This glass material is characterized by being comprised of glass that has a scattering coefficient of greater than or equal to 0.01 $cm^{-1}$ at at least one wavelength of from 400 to 2,500 nm or comprises crystals with a volumetric ratio of greater than $10^{-5}$, when maintained for three hours at a temperature ten degrees higher than the glass transition temperature, maintained for ten minutes at a temperature at which it exhibits a viscosity of $10^{4.5}$ to $10^{3.5}$ dPa·s, and rapidly cooled to room temperature, and, by having a scattering coefficient of glass interior at at least one wavelength from 400 to 2,500 nm of less than 0.005 $cm^{-1}$ or comprises in interior crystals with a volumetric ratio of less than $10^{-6}$, when maintained for 10 min at a temperature yielding a viscosity of $10^{4.5}$ to $10^{3.5}$ dPa·s and then rapidly cooled to room temperature.

The term "scattering coefficient of glass interior" refers to scattering coefficient of interior of glass or glass material from which surface layer has been removed. The surface layer is defined by any of the followings:

(1) an area adjacent to the surface with the same depth as the surface layer removed in manufacturing a final glass product by grinding and polishing a blank (intermediate product) of the final product (for example, optical element) prepared by press molding a heated and softened glass material;

(2) an area within 2 mm in depth from the surface of glass or glass material; and (3) the center of glass or glass material.

In the present invention, crystals causing light scattering are those deposited in the interior of glass. A surface crystallized layer generates occasionally in an area several micrometer to 2 mm in depth from the surface and which layer is thought to be generated due to hydroxyl groups connected to the glass surface upon press molding of glass material or other adhered materials. However, different from crystals present in glass interior, this crystallized layer is thoroughly removed by grinding and polishing, and this not problematic. Thus, it is sufficient to estimate scattering coefficient of glass interior in order to know conditions of glass material which is suitable or not to a material for the final product such as optical element.

Volumetric ratio of crystals are similarly employed for establishing conditions of glass material which is suitable or not to a material for the final product such as optical element by considering volumetric ratio of crystals present in an interior of glass obtained by removing the above-mentioned surface layer of glass material.

The glass material for press molding obtained in this manner may be press molded when necessary. For example, a mold releasing agent in powder form may be applied to the surface of the material, the material heated and softened, and the softened material press molded in a press mold equipped with upper and lower molds.

The press molded article obtained may be annealed to remove distortion. The annealing temperature employed may be suitably higher than the usual annealing temperature, that is, equal to or greater than the Tg.

Press molds producing blanks for lenses and optical substrates may be used to mold the glass material and grinding and polishing may be conducted following annealing to obtain the targeted lens or optical substrate, as well as other optical elements.

Transparent optical elements can be manufactured in this manner.

EXAMPLES

The present invention is described in greater detail below through examples. However, the present invention is not limited in any manner by these examples.

Examples 1–8 and Comparative Example 1

Starting material batches adjusted to yield 100 g of glasses of the compositions shown in Tables 1 and 2 were charged to platinum crucibles, melted in a furnace set to 1,200 to 1,350° C., stirred, clarified, poured into iron frames, maintained at a temperature about 30° C. lower than the glass transition temperature (Tg), and cooled, yielding various optical glasses. The physical properties thereof are given in Tables 1 and 2. The refractive indexes (nd), Abbé numbers (vd), glass transition temperatures (Tg), λ 70 values, and crystal grain number densities thereof were measured as follows.

(1) The Refractive Index (nd) and Abbé Number (vd)

These are values measured for optical glass obtained by cooling at a 30° C. temperature reduction rate.

(2) The Glass Transition Temperature (Tg)

This is a value measured at a temperature increase rate of 4° C./min with a thermomechanical analyzer.

(3) λ 70

This is the wavelength at which the transmittance reached 70 percent during measurement of the spectral transmittance of a ground sample 10 mm in thickness (an optical glass sample optically ground on both surfaces). All of the glasses in the present examples had spectral transmittances exceeding 70 percent in the visible wavelength range to the long wavelength side of the λ 70 wavelength.

(4) The Crystal Grain Number Density

Each of glass pieces prepared from each of the optical glasses was maintained for 5 hours at a temperature 20° C. higher than the glass transition temperature (Tg) of the individual glass, subsequently maintained for 5 min at 900° C., and then cooled. Samples measuring 3×3×1 mm were prepared from the pieces such that the samples include the center of the pieces and then the interior of the glass sample was then examined by optical microscopy, at a magnification 50-fold, the number of precipitated crystal grains was determined, the number of crystal grains per unit volume (mm unit) was calculated, and this value was adopted as the crystal grain number density.

TABLE 1

| | Example | | | | |
|---|---|---|---|---|---|
| | 1 | 2 | 3 | 4 | 5 |
| Glass Composition (wt %) | | | | | |
| $SiO_2$ | 24.90 | 24.90 | 25.90 | 27.40 | 28.90 |
| BaO | 16.10 | 16.10 | 14.10 | 19.60 | 13.10 |
| $TiO_2$ | 29.60 | 29.60 | 29.60 | 25.60 | 30.60 |
| $Nb_2O_5$ | 14.10 | 13.10 | 14.10 | 14.10 | 13.10 |
| $Na_2O$ | 12.50 | 8.50 | 12.50 | 10.50 | 10.50 |
| $K_2O$ | 0.00 | 4.00 | 0.00 | 0.00 | 0.00 |
| CaO | 0.80 | 0.80 | 0.80 | 0.80 | 1.30 |
| SrO | 0.00 | 0.00 | 1.00 | 0.00 | 0.00 |
| $ZrO_2$ | 1.98 | 2.00 | 2.00 | 2.00 | 2.00 |
| $Ta_2O_5$ | 0.00 | 1.00 | 0.00 | 0.00 | 0.50 |
| $Sb_2O_5$ | 0.02 | 0.00 | 0.00 | 0.00 | 0.00 |
| Total | 100.00 | 100.00 | 100.00 | 100.00 | 100.00 |
| Weight Ratio $SiO_2/TiO_2$ | 0.8412 | 0.8412 | 0.8750 | 1.070 | 0.9444 |
| Glass properties | | | | | |
| Refractive Index (nd) | 1.84711 | 1.8417 | 1.842 | 1.82725 | 1.84512 |
| Abbé number (vd) | 23.76 | 23.97 | 23.93 | 25.2 | 23.96 |
| λ70 (nm) | 420 | 433 | 442 | 434 | 429 |
| Glass Transition temperature (Tg) (° C.) | 615 | 611 | 615 | 614 | 625 |
| Number Density of Crystal grains (/mm³) | 10 | 10 | 6 | 4 | 5 |

TABLE 2

| | Example | | | Comparative Example | |
|---|---|---|---|---|---|
| | 6 | 7 | 8 | 1 | 2 |
| Glass Composition (wt %) | | | | | |
| $SiO_2$ | 24.90 | 25.31 | 24.10 | 22.30 | 22.30 |
| BaO | 15.90 | 16.04 | 21.10 | 14.10 | 16.30 |
| $TiO_2$ | 28.20 | 29.10 | 24.60 | 31.00 | 29.30 |
| $Nb_2O_5$ | 15.70 | 14.60 | 16.10 | 16.30 | 16.10 |
| $Na_2O$ | 12.50 | 12.15 | 13.30 | 13.50 | 13.10 |
| $K_2O$ | 0.00 | 0.00 | 0.00 | 0.00 | 0.00 |
| CaO | 0.80 | 0.80 | 0.80 | 0.80 | 0.80 |
| SrO | 0.00 | 0.00 | 0.00 | 0.00 | 0.00 |
| $ZrO_2$ | 2.00 | 2.00 | 0.00 | 2.00 | 2.10 |
| $Ta_2O_5$ | 0.00 | 0.00 | 0.00 | 0.00 | 0.00 |
| $Sb_2O_5$ | 0.00 | 0.00 | 0.00 | 0.00 | 0.00 |
| Total | 100.00 | 100.00 | 100.00 | 100.00 | 100.00 |
| Weight Ratio $SiO_2/TiO_2$ | 0.8830 | 0.8698 | 0.9797 | 0.7194 | 0.7611 |
| Glass Properties | | | | | |
| Refractive Index (nd) | 1.84565 | 1.84549 | 1.8182 | 1.849 | 1.8422 |
| Abbé number (vd) | 23.9 | 23.86 | 26.3 | 23.62 | 23.92 |
| λ70 (nm) | 418 | 433 | 405 | 450 | 440 |
| Glass Transition temperature (Tg) (° C.) | 615 | 619 | 600 | 602 | 610 |
| Number Density of Crystal grains (/mm³) | 6 | 9 | 4 | 27 | 25 |

It will be understood from Tables 1 and 2 that all of the examples had refractive indexes (nd)≧1.80 and Abbé numbers (vd)≦30. All of the examples had glass transition temperatures (Tg) of greater than or equal to 600° C. and less than or equal to 630° C. The 70 was less than or equal to 442 nm for all of the examples.

In the optical glasses of Comparative Examples 1 and 2, devitrification of the glass was observed even with the direct press method. Further, in the method of reheating and press molding following annealing, the whole glasses including their interior clouded over due to crystallization and the number of crystal grains could not be counted even by microscope.

It will be understood from Tables 1 and 2 that when the weight ratio of $SiO_2/TiO_2$ increased beyond 0.8, the number of crystals decreased and nucleus formation due to annealing was inhibited.

FIG. 1 shows the results of annealing of the individual optical glasses of Comparative Examples 1 and 2. In FIG. 1, the temperatures maintained for 5 min within the range of 590 to 650° C. were varied by 10° C. each, and changes in the number of crystal grains when maintained for 5 min at 900° C. are given. Conventionally, a long time is required to eliminate distortion even when annealing is conducted at an extremely low temperature when reheating is conducted following annealing and the vicinity of the glass transition temperature (Tg), which is the temperature range at which annealing is conducted, corresponds to the nucleus forming temperature range. However, in the glass of Example 1, since nucleus generation tended not to occur due to annealing, it was possible to conduct annealing in the vicinity of the glass transition temperature (Tg).

Example 9

Glass materials for press molding comprised of the optical glasses obtained in Examples 1 through 8 were manufactured by Methods 1 and 2 indicated below.

<Method 1>

Glass melt was continuously cast through a platinum alloy flow pipe into a casting mold having an opening on one of its lateral surfaces. The glass melt was cooled to obtain plate glass of constant width and thickness. The formed glass was drawn out through the opening, passed through an annealing furnace, and annealed. The annealing temperature was the glass transition temperature (Tg), or slightly higher than the Tg, of each of the glasses. The annealed glass was cut to constant length by a cutter. The glass sheets obtained had little distortion and were not damaged during cutting.

Next, the glass sheets were cut to constant size to obtain multiple glass blocks called "cut pieces". The cut pieces were barrel ground, their edges were rounded, and weight adjustment was conducted to render the pressure molded articles equal in weight. In this process, the fully annealed glass was not damaged.

<Method 2>

As in Method 1, glass melt was caused to continuously flow through a platinum alloy flow pipe at constant speed and sequentially received by multiple forming molds to form glass blocks. The glass blocks were removed from the forming molds when the temperature of the glass dropped below the glass transition temperature and were maintained at the glass transition temperature (Tg) or slightly higher. The annealed glass blocks were then barrel ground to render the weight of the press molded articles identical. In this process, the fully annealed glass was not damaged.

Here, the glass sheet molded by Method 1 can be a glass material for press molding obtained by cutting and machining in the form of barrel grinding prior to being press molded, and the barrel ground glass can be a glass material for press molding that is press molded without subsequent machining. Further, the glass blocks that were molded by Method 2 prior to barrel grinding can be a glass material for press molding that is cut and machined by barrel grinding prior to press molding, and the barrel ground glass can be a glass material for press molding that can be press molded without machining.

None of the glass materials for press molding devitrified when press molded after annealing.

By contrast, when the same process was conducted with the glasses of Comparative Examples 1 and 2, devitrification was observed in the press molded articles.

Example 10

In Example 9, press molding was conducted using the optical glasses obtained in Example 1 to 8 by coating barrel ground glass materials for press molding prepared by Method 1 with a mold releasing agent in the form of boron nitride power, placing the glass materials on a softening dish, softening them by heating them and placing them in a softening furnace, and then transferring them to in a press molding mold equipped with upper and lower molds. The temperature of the glass blocks prior to press molding was adjusted to yield a glass viscosity of $10^4$ Pa·s. The lens blanks obtained by press molding were annealed to reduce distortion, then ground and polished to obtain optical lenses. All the lenses had optical constants in the form of refractive indexes (nd) of greater than or equal to 1.80 and Abbé numbers of less than or equal to 30, were transparent, and did not exhibit devitrification. As needed, optical multilayered films such as antireflective films could be provided on the lens surfaces.

Next, the barrel ground glass materials for press molding obtained by method 2 in Example 9 from the optical glasses obtained in Examples 1–8 were press molded in the same manner, annealed, ground, and polished, yielding transparent optical lenses having optical constants in the form of refractive indexes (nd) of greater than or equal to 1.80 and Abbé numbers (vd) of less than or equal to 30. No devitrification was observed in these lenses, either. As needed, optical multilayered films such as antireflective films could be provided on the lens surfaces.

Various lenses, prisms, filters, optical substrates, and other optical elements may be obtained in the same manner.

Example 11

(Melting the Glass)

Glass of the composition shown in Table 3 was prepared. The starting materials employed were $SiO_2$, $Na_2CO_3$, $CaCO_3$, $BaCO_3$, $TiO_2$, $Nb_2O_5$, and $ZrO_2$. The starting materials were weighed out in a prescribed weight ratio, intimately mixed, charged to a platinum crucible, melted for 2 hours in an electric furnace maintained in advance at 1,350° C., clarified, and homogenized.

TABLE 3

|  | (wt %) |
| --- | --- |
| $SiO_2$ | 22.3 |
| $Na_2O$ | 13.1 |
| CaO | 0.8 |
| BaO | 16.3 |
| $TiO_2$ | 29.3 |

TABLE 3-continued

| | (wt %) |
|---|---|
| $Nb_2O_5$ | 16.1 |
| $ZrO_2$ | 2.1 |
| Total | 100.0 |

Homogeneous glass was obtained by causing a glass melt to flow into a casting mold of graphite that had been preheated to 550° C. and solidifying the glass by rapid cooling. The glass was immediately charged to a furnace maintained at 550° C. and slow cooled in this furnace to adequately eliminate distortion for subsequent cold processing. The state of this glass was denoted as state A.

(Measurement of the Glass Transition Temperature, Scattering Coefficient, and Volumetric Ratio of Crystals)

The glass transition temperature of the glass material in state A was measured. The measurement was conducted with reference to the Japan Optical Glass Industry Association Standard, "Method of measuring thermal expansion of optical glass" (JOGIS08-1975). The sample employed had a shape 20.0 mm in length with a 5 mm diameter. The glass transition temperature of the glass thus measured was 610° C.

The glass was slit and parallel ground and the internal transmittance thereof was measured. The internal transmittance converted to a thickness of 10 mm at a wavelength of 588 nm corresponding to roughly the middle wavelength of the visible range was greater than 99.5 percent and the scattering coefficient was less than 0.002 $cm^{-1}$. The scattering coefficient at wavelengths of 400 to 2,500 nm was less than 0.005 $cm^{-1}$. Generally, it is easier to measure the volumetric ratio of crystals contained in the glass than to measure the internal transmittance over a wide wavelength range of 400 to 2,500 nm and convert it to a scattering coefficient. Here, the volumetric ratio of crystals in the glass was measured. No crystals were found by observation of the interior portion and the volumetric ratio of crystals was much lower than $10^{-6}$; essentially no scattering loss was found to be present at visible to infrared transmission threshold wavelengths.

(Heat Treatment, Measurement of Scattering Coefficient and Crystal Volumetric Ratio Following Heat Treatment)

The glass was divided, heated to 620° C., which was 10° C. higher than the glass transition temperature, and maintained for 3 hours at that temperature. The glass was then heat treated at 900° C., at which temperature it exhibited a viscosity of $10^{4.5}$ to $10^{3.5}$ dPa·s, and then rapidly cooled to room temperature. The internal transmittance of this glass was measured by the above-described method. The internal transmittance was found to be 95 percent and the scattering coefficient 0.052 $cm^{-1}$. Microscopic observation of the interior portion of the glass revealed the precipitation of 200 or more crystals about 20 micrometers in diameter and 200 micrometers in length (with a volume of about $6.3 \times 10^{-8}$ mL) per mL. The crystal volumetric ratio at that time was found to be greater than or equal to $1 \times 10^{-5}$. That is, the crystallization resistance stability of this glass was found to have been severely compromised by annealing at a temperature greater than or equal to its glass transition temperature.

(Forming and Annealing of the Glass)

The above-described glass melt was made to flow into a casting mold, glass plates of specific thickness and width were molded, and the following annealing was conducted to thoroughly eliminate glass distortion: A temperature of 585° C., lower than the Tg, was maintained for 3 hours, the temperature was dropped 30 degrees an hour to 485° C., and the glass was subsequently cooled to room temperature at a rate of 50–100 degrees/hour. The glass plate was then cut into cubes measuring about 20×30×30 mm and processed to obtain glass blocks called cut pieces. The above-described annealing thoroughly eliminated glass distortion, with no problems of splintering or splitting being encountered during cutting. The cut pieces were barrel ground to finish the glass material for press molding.

Next, the same glass melt was made to flow continuously out of a flow pipe, fixed quantities of glass melt were received in indentations in forming molds conveyed one after the other beneath the flow pipe, marble-shaped glass gobs were formed, and annealing was conducted under the same conditions was set forth above. Following annealing, barrel grinding was conducted to finish the glass material for press molding. This method also thoroughly eliminated glass distortion and no problems of splintering or splitting were encountered during barrel grinding.

After forming glass members from the glass melt and conducting annealing in this manner, the machined (for example, cut and barrel ground as set forth above) materials for press molding were maintained for 10 minutes at a temperature at which they exhibited a viscosity of $10^{4.5}$ to $10^{3.5}$ dPa·s and rapidly cooled to room temperature. The scattering coefficient at wavelengths of 400 to 2,500 nm and the crystal volumetric ratio in the interior of the material were measured, revealing that the scattering coefficient at wavelengths of 400 to 2,500 was less than 0.005 $cm^{-1}$, with no crystals being found in the interior of the material. The material for press molding had a weight equal to that of the targeted press molded article, and the shape was in accordance with the press molding to be conducted. Examples are shapes having axes of rotational symmetry such as marbles, spheres, and rotated ellipsoids.

Figure 4:
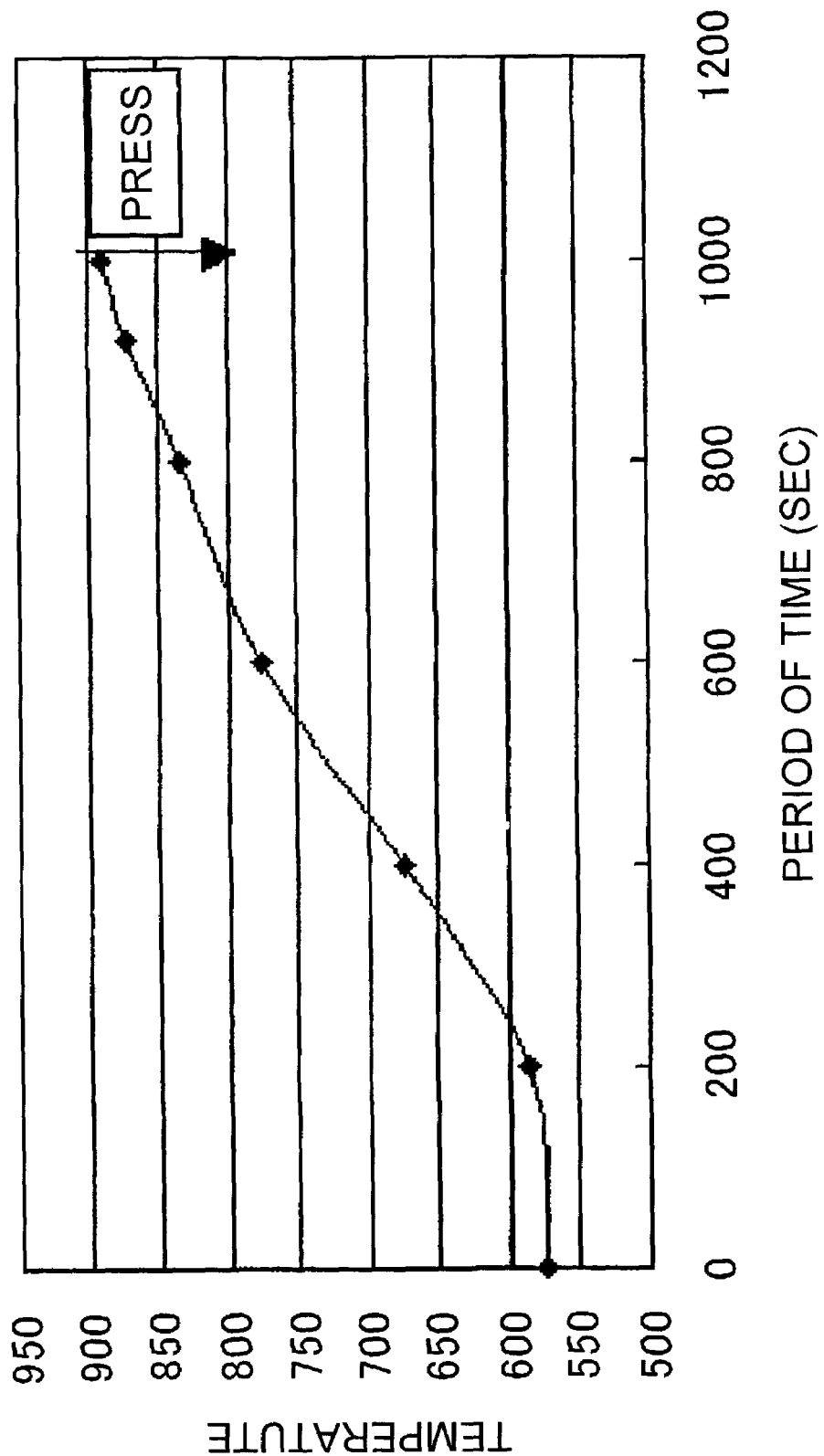
FIG. 4 is the heating schedule employed for the reheat pressing of Example 10. This heating schedule corresponds to heating of the glass beyond 575° C. after the glass has been heated from room temperature to 575° C. over a period of about one hour.

Next, reheat pressing was conducted according to the heating schedule indicated in FIG. 4 with the glass material for press molding obtained in this manner. However, the temperature was raised from room temperature to 575° C. over about an hour, with increases in temperature beyond 575° C. being in accordance with the heating schedule. The lens blanks manufactured by reheat press molding were annealed, after which interior observation was conducted, revealing no crystal precipitation. This molded glass was ground and polished, yielding transparent lenses.

Comparative Example 3

Glass melt was melted and solidified by rapid cooling in the same manner as in Example 10, after which annealing was conducted at a temperature of 615° C., which was slightly higher than the Tg of the glass, to eliminate distortion (the glass was maintained for 3 hours at 615° C. and then cooled to 500° C. at a rate of 30 degrees/hour; subsequently, the glass was cooled to room temperature at a rate of 50 to 100 degrees/hour).

The glass was cut into dimensions of about 20×30×30 mm and reheat pressed in the same manner as in the examples.

A large number of crystals were found on the interior of the glass manufactured by reheat pressing. About 200 crystals roughly 20 micrometers in diameter and 100 micrometers in length (with a volume of about $3.2 \times 10^{-8}$ cc) had precipitated out per cubic centimeter, precluding the use of the glass in optical elements.

The present invention provides optical glass having resistance to devitrification, a high refractive index, and good dispersion characteristics.

Further, the glass material for press molding of the present invention permits the manufacture of press molded articles without devitrification from optical glass having a high refractive index and good dispersion characteristics.

Still further, the present invention provides optical elements of glass having a high refractive index and good dispersion in which devitrification is not observed, and a method of stably providing such optical elements.

Still further, the present invention permits the manufacturing of glass materials for press molding of glass that tends to devitrify but that permits the molding of high-quality reheat press molded articles, press molded articles employing these glass materials, and optical elements employing such press molded articles.

The present disclosure relates to the subject matter contained in Japanese Patent Application No. 2001-316630 filed on Oct. 15, 2001 and Japanese Patent Application No. 2001-349255 filed on Nov. 14, 2001, which is expressly incorporated herein by reference in its entirety.

What is claimed is:

1. An optical glass comprising, expressed as weight percentages, greater than 18.92 percent and less than 30 percent of $SiO_2$, greater than or equal to 12 percent and less than 23 percent of BaO, 22 to 37 percent $TiO_2$, greater than or equal to 7 percent and less than 16 percent $Nb_2O_5$, 5 to 20 percent of $Na_2O$, 0 to 6 percent of $K_2O$, 0 to 5 percent of CaO, 0 to 5 percent of SrO, greater than 0 to equal to or less than 4 percent of $ZrO_2$, 0 to 3 percent of $Ta_2O_5$, 0 to 1 percent of $Sb_2O_5$, and greater than or equal to 0 percent and less than 0.5 percent of $P_2O_5$, and essentially not comprising PbO, $As_2O_3$, and F; and wherein the weight ratio $SiO_2/TiO_2$ of $SiO_2$ to $TiO_2$ exceeds 0.86, and the index of refraction (nd) is greater than or equal to 1.84 and the Abbé number (vd) is less than or equal to 25.

2. An optical glass according to claim 1, wherein the optical glass has a resistance to devitrification such that the number density of the crystal particles precipitating out after being maintained for five hours at a temperature 20° C. higher than the glass transition temperature and then for five minutes at 900° C. is less than or equal to $12/mm^3$ and, wherein said glass exhibits a refractive index (nd) greater than or equal to 1.84 and an Abbé number (vd) less than or equal to 25.

3. An optical element comprised of the optical glass according to claim 1 or 2.

4. A method of manufacturing glass material for press molding comprising:
   forming a melt glass;
   forming a formed glass from the melt glass;
   annealing the formed glass; and
   machining the annealed glass to obtain a glass material for press molding comprised of the optical glass of claim 1 or 2.

5. A method of manufacturing optical elements comprising press molding a blank of the optical element with similar shape to the objective optical element, and subjecting the blank to grinding and polishing to obtain the optical element, wherein said blank of optical element is prepared by a method comprising forming a melt glass; annealing the formed glass; reheating the formed glass and press molding the formed glass to obtain the blank of optical element, and wherein the optical element comprising, as weight percentages, greater than or equal to 12 percent and less than 23 percent BaO, 22 to 37 percent $TiO_2$, greater than or equal to 7 percent and less than 16 percent of $Nb_2O_5$, 5 to 20 percent $Na_2O$, and $SiO_2$ in a quantity of from 0.8 to 1.36 times the quantity of $TiO_2$, essentially not comprising PbO, $As_2O_3$, and F, and having a refractive index (nd) of greater than or equal to 1.80 and an Abbé number (vd) of less than or equal to 30, and wherein the weight ratio $SiO_2/TiO_2$ of $SiO_2$, to $TiO_2$, exceeds 0.86.

6. A method of manufacturing optical elements characterized by comprising:
   annealing a formed product obtained by forming the optical glass of claim 1 or 2;
   machining;
   reheating; and
   press molding in a softened state.

7. The method of manufacturing optical elements of claim 6, wherein said annealing is conducted at a temperature equal to or greater than the transition temperature of said optical glass.

8. A method of manufacturing optical elements characterized by comprising:
   annealing a formed product obtained by forming a glass comprising, as weight percentages, greater than or equal to 18 percent and less than 30 percent of $SiO_2$, greater than or equal to 12 percent and less than 23 percent of BaO, 22 to 37 percent $TiO_2$, greater than or equal to 7 percent and less than 16 percent Nb2O5, 5 to 20 percent of $Na_2O$, 0 to 6 percent of $K_{20}$, 0 to 5 percent of CaO, 0 to 5 percent of SrO, 0 to 4 percent of $ZrO_2$, 0 to 3 percent of $Ta_2O_5$, 0 to 1 percent of $Sb_2O_5$, greater than or equal to 0 percent and less than 0.5 percent of $P_2O_5$, and essentially not comprising PbO, $As_2O_3$, and F, the weight ratio $SiO_2/TiO_2$ of $SiO_2$ to $TiO_2$, exceeding 0.86;
   machining;
   reheating; and
   press molding in a softened state.

9. The method of manufacturing optical elements of claim 8, wherein said annealing is conducted at a temperature equal to or greater than the transition temperature of said optical glass.

10. A method of manufacturing optical elements according to claim 8, wherein the method comprising:
    annealing a formed product obtained by forming a glass which has a refractive index (nd) greater than or equal to 1.80, the Abbé number (vd) less than or equal to 30, and has a resistance to devitrification such that the number density of the crystal particles precipitating out after being maintained for five hours at a temperature 20° C. higher than the glass transition temperature and then for five minutes at 900° C. is less than or equal to $12/mm^3$.

11. The method of manufacturing optical elements of claim 10, wherein said annealing is conducted at a temperature equal to or greater than the transition temperature of said optical glass.

12. The optical glass according to claim 1 or 2, wherein a total content of $SiO_2$, BaO, $TiO_2$, $Nb_2O_5$, $Na_2O$, $K_{20}$, CaO, SrO, $ZrO_2$, $Ta_2O_5$, and $Sb_2O_5$ is greater than or equal to 99 percent.

13. An optical element comprised of the optical glass according to claim 12.

* * * * *